United States Patent
Peterson

(10) Patent No.: US 6,637,708 B1
(45) Date of Patent: Oct. 28, 2003

(54) ARTICULATED AIMING SUPPORT

(76) Inventor: Thomas K. M. Peterson, 124 Stoney Point Rd., Courtland, MN (US) 56021

( * ) Notice: Subject to any disclaimer, the term of this patent is extended or adjusted under 35 U.S.C. 154(b) by 0 days.

(21) Appl. No.: 09/992,166

(22) Filed: Nov. 14, 2001

(51) Int. Cl.$^7$ ................................................ E04G 3/00
(52) U.S. Cl. ............................. 248/285.1; 248/122.1; 248/236.61; 42/94; 182/187
(58) Field of Search ................. 182/187, 188; 42/94; 127/23.1, 24.1, 86, 88; 248/122.1, 236.61, 286.1, 285.1, 287.1; D22/108, 199; 297/217.1

(56) References Cited

U.S. PATENT DOCUMENTS

| | | | |
|---|---|---|---|
| 2,635,680 A | * | 4/1953 | Zentmire |
| 3,396,818 A | * | 8/1968 | Moragne |
| 4,318,567 A | * | 3/1982 | Guthier ........................ 135/16 |
| 4,662,265 A | | 5/1987 | Becker et al. ............. 89/37.09 |
| 4,729,363 A | | 3/1988 | Skyba ........................... 124/23 |
| 4,886,229 A | | 12/1989 | Arizpe-Gilmore .......... 248/125 |
| 4,936,415 A | | 6/1990 | Williams ..................... 182/187 |
| 5,149,900 A | | 9/1992 | Buck ............................. 42/94 |
| 5,186,276 A | | 2/1993 | Craig ........................... 182/187 |
| 5,311,967 A | * | 5/1994 | Kennedy ..................... 182/133 |
| 5,344,110 A | | 9/1994 | Scarpa ......................... 248/229 |
| 5,363,941 A | * | 11/1994 | Richard ....................... 108/152 |
| D355,694 S | * | 2/1995 | Stafford, Jr. ............... D22/107 |
| 5,476,241 A | * | 12/1995 | Helman .................... 248/286.1 |
| 5,481,817 A | | 1/1996 | Parker ......................... 248/286 |
| 5,518,083 A | * | 5/1996 | Blennert ...................... 182/188 |
| 5,626,322 A | * | 5/1997 | Braun ....................... 248/274.1 |
| D382,035 S | * | 8/1997 | Swicegood ................ D22/108 |
| 5,685,104 A | * | 11/1997 | Breazeale, Jr. ........... 248/287.1 |
| 5,688,024 A | | 11/1997 | Arizpe-Gilmore ....... 297/217.1 |
| 5,884,966 A | * | 3/1999 | Hill et al. .................... 297/170 |
| 5,913,668 A | | 6/1999 | Messer .......................... 42/94 |
| 5,987,804 A | * | 11/1999 | Shearer et al. .............. 43/21.2 |
| 5,997,080 A | * | 12/1999 | Newhouse et al. ..... 297/188.08 |
| 6,032,911 A | | 3/2000 | Osborne .................. 248/309.1 |
| 6,244,556 B1 | * | 6/2001 | Carrillo et al. ............. 182/187 |

* cited by examiner

*Primary Examiner*—Korie Chan
(74) *Attorney, Agent, or Firm*—Nawrocki, Rooney & Sivertson, P.A.

(57) ABSTRACT

An aiming support apparatus dependable from a central portion of a shooting platform is provided. The apparatus includes an arm having a base and an extension selectively extendible from a free end of the arm base. The arm extension includes a socket adapted to receive a shooting staff. The arm base is suspended from a bracket assembly for pivot motion about a pivot axis. The bracket assembly is affixable to the shooting platform so as to substantially underlay a shooter positioned thereon, the socket being swingingly positionable beyond a perimeter of the shooting platform in response to a marksman's torso motions in furtherance of pursuit of a scoped target.

23 Claims, 5 Drawing Sheets

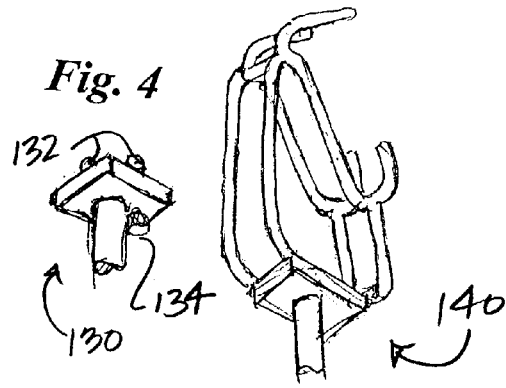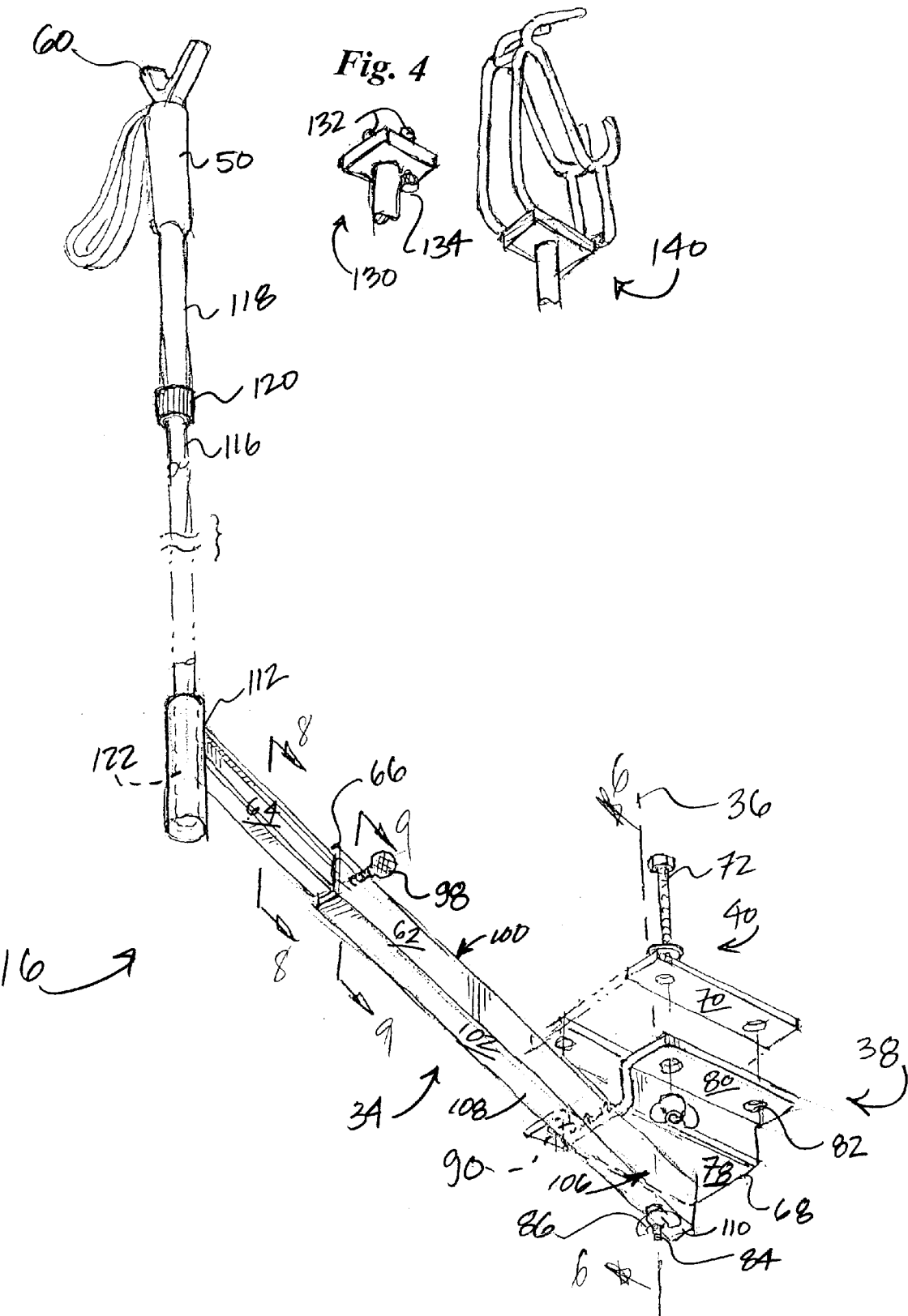

ARTICULATED AIMING SUPPORT

TECHNICAL FIELD

The present invention relates generally to an aiming support apparatus, and still more particularly to an articulated, easily guidable, platform dependable device for supporting a weapon or other viewing type apparatus, for instance a camera, telescope, etc.

BACKGROUND OF THE INVENTION

Many field viewing scenarios require, at a minimum, a steady, oftentimes long duration readied support of a viewing apparatus, or device incorporating a viewing apparatus. Such filed viewing scenarios that immediately come to mind, include, but are not limited to hunting, photography, videoegraphy, and astronomy. The viewing apparatus may be integral to another device (e.g., scope of a rifle, sight of a bow, view finder of a camera, etc.), or stand alone (e.g., telescope).

As is well known by practitioners of the aforementioned activities, particularly hunting, the "perfect shot" is sought. Inherent in this goal, is not just waiting, but waiting at the ready while supporting the viewing apparatus/weapon. In a perfect, arguably all be it less challenging world, sought after targets could cooperate by being not only stationary, but by also being predictable, to the point of absolute certainty, with regard not only to their position, but also to their entrance into a viewer's field of vison, as if on cue (e.g., a cineamatographic environment or scenario). Instead, as is well known, the "target" typically enters with very little notice, and, in all instances, unpredictably moves about, as is the case with a deer, a boar, or the game's leading rusher. Furthermore, there are a plurality of potential distractions typically encountered, for instance, weather or a combination of weather related conditions (e.g., heat, cold, precipitation, wind, glare, etc.), and field obstacles (e.g., ground or other cover), each of which weigh upon a viewer's concentration and focus, thusly being a foe to alertness.

In a hunting scenario, using weapon or camera, a person either in a standing, crouching or prone position can aim a approximately 180° horizontally and 180° vertically, and at all points in between. Without the aid of a stabilizing device such as, for example, a conventional weapon support, a marksman may shoot within the above described parameters. However, it is known that a marksman holding a weapon in an unsupported fashion is less able to establish and maintain an accurate aim than is one who is utilizing a stabilizing device. A conventional weapon support, however, greatly restricts the spherical range of one's shooting, and increases the time requirement of taking aim, particularly at a moving target.

Conventional weapon supports generally include a seat in combination with a table-like surface upon which the marksman rests his or her arms. The inherent disadvantage of such firearm supports is that the user remains limited or restricted in the number of adjustments he or she can make in connection with his or her aim. For example, a flat bench-type firearm support is of little assistance if the target is significantly uphill or downhill from the shooter. A further disadvantage of a conventional firearm support is that, as a general rule, such devices are not designed to be transported into the field, tending to be bulky and/or heavy, therefore effectively limiting their application to one particular pre-arranged area such as, for example, a shooting range.

More recent approaches to improving upon conventional weapon supports have included the inclusion of an arm, segmented or otherwise, extending from a base, see for example U.S. Pat. No. 5,913,668 (Messer), a tripod, U.S. Pat. No. 5,688,024 (Arizpe-Gilmore) and U.S. Pat. No. 5,149,900 (Buck), rotating seats, and U.S. Pat. No. 4,886,229 (Arizpe-Gilmore), a fixed seat. In the heretofore referenced approaches, a pivotable or swivelling weapon cradle is provided at a free end of the arm, which is fixed to the base, itself being capable of swivelling or rotation. Although permitting an improved degree of freedom of motion for pursuit of game, such structures are beneficially limited, lacking among other features, a common pivot axis for the shooter and the weapon. This shortcoming, in addition to others, is also evident in user attachable weapon supports (i.e., those securable to an edge of a base, for instance a seat or a platform), such as those disclosed in U.S. Pat. No. 6,032,911 (Osborne), U.S. Pat. No. 5,481,817 (Parker), U.S. Pat. No. 5,344,110 (Scarpa), and U.S. Pat. No. 4,936,415 (Williams). Thus, there remains a need to provide viewers with an improved aiming support apparatus which performs a resting and stabilizing function, as well as one which respondingly and ergonomically swivels in response to the pivoting torso motions of a marksman following a sighted target.

SUMMARY OF THE INVENTION

An aiming support apparatus dependable from a central portion of a shooting platform is provided. The apparatus includes an arm having a base and an extension selectively extendible from a free end of the arm base. The arm extension includes a socket adapted to receive a shooting staff. The arm base is suspended from a bracket assembly for pivot motion a pivot axis. The bracket assembly is affixable to the shooting platform so as to substantially underlay a shooter positioned thereon, the socket being swingingly positionable beyond a perimeter of the shooting platform in response to a marksman's torso motions in furtherance of pursuit of a scoped target.

An aiming support assembly is further provided, the assembly including a shooting platform and an articulated armature assembly depending from an interior portion thereof. The armature assembly includes an extendable arm adapted at a free end thereof to receive a staff. The arm is pivotable about a pivot axis which is substantially aligned with a center of mass of a marksman positioned upon the shooting platform.

The foregoing and other objects, features, and advantages of the invention will be apparent with reference to the figures and from the following DETAILED DESCRIPTION OF THE INVENTION. The figures are not necessarily to dimensional or geometric scale, nor do they necessarily represent structures in accurate or representative relative scale. Emphasis rather is placed upon illustrating principals of the invention in a clear manner.

BRIEF DESCRIPTION OF THE DRAWINGS

FIG. 3 is a perspective underside view of the aiming support apparatus in combination with a weapon staff, more particularly a staff including a cradle, namely a fork;

FIG. 4 is a perspective underside view of a camera/scope platform;

FIG. 5 is a perspective underside view of a bow cradle;

DETAILED DESCRIPTION OF THE INVENTION

Figure 1:
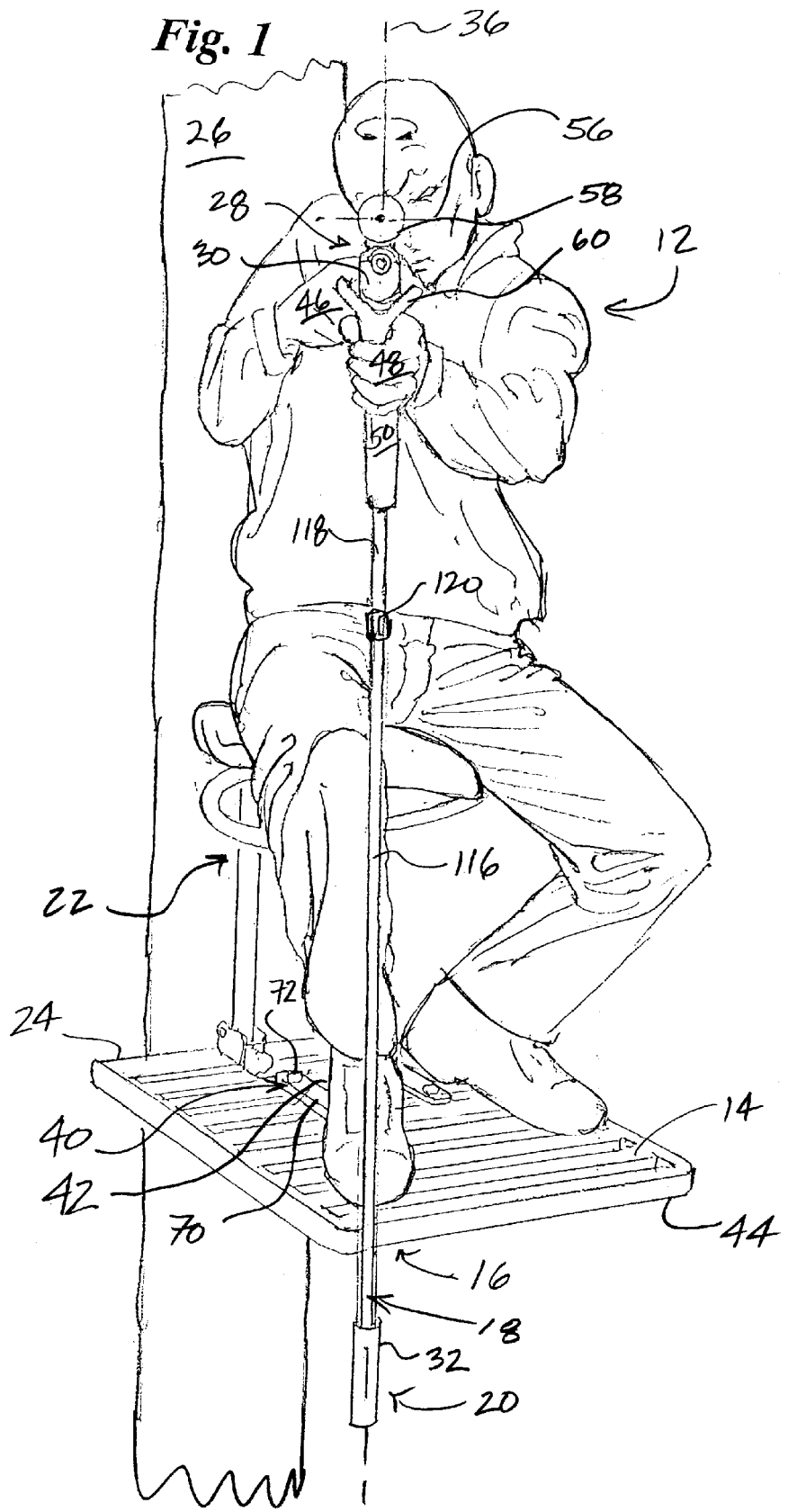
FIG. 1 is a perspective view illustrating a marksman actively employing the aiming support apparatus of the subject invention in combination with a tree stand and weapon staff.
Figure 2:
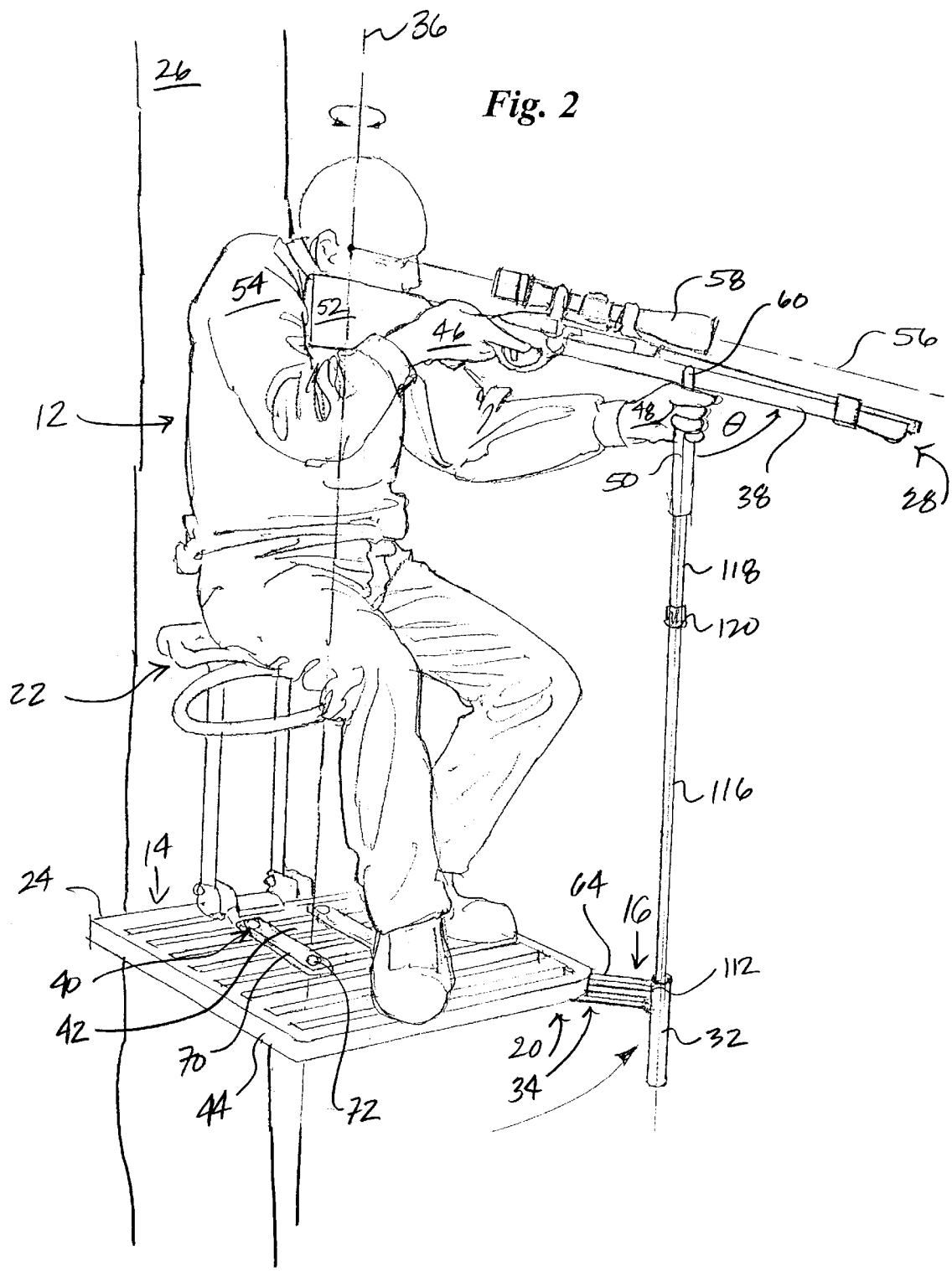
FIG. 2 depicts the marksman of FIG. 1 having followed a sighted target to his left and down.

Referring to FIGS. 1 & 2, a marksman 12 is shown in shooting readiness, observing a target from a tree stand, or more generally a platform or base 14 equipped with the aiming support apparatus 16 of the subject invention in combination with a weapon staff 18. In FIG. 1, the marksman 12 is shown having at least preliminarily sighted the target, while in FIG. 2 the marksman 12 has followed the target which has moved marginally closer, and to his left. Prior to detailed discussion of the apparatus of the subject invention, its features and their interrelationships, the general benefits associated with same will be highlighted by way of discussion of an aiming support assembly 20 of the subject invention.

Again referring to FIGS. 1 & 2, the aiming support assembly 20 preferably includes the aiming support apparatus 16, the platform or base 14, and a ideally includes a telescoping weapon staff 18. The marksman 12 is shown generally positioned upon the platform 14 such that his center of mass is centrally located and supported, a seat assembly 22 optionally extending upwardly and forwardly from the rear edge 24 of the platform 14 (i.e., the platform edge adjacent tree 26).

A weapon 28, more particularly the forestock 30, is shown supported by the weapon staff 18 for angulation of the weapon 28 relative to the horizon. The weapon staff 18 in turn is supported within a socket 32 of an arm 34 of the aiming support apparatus 16. As will subsequently discussed in further detail, the arm 34 of the apparatus 16 is pivotingly suspended about a pivot axis 36 from a bracket assembly 38, which may, as shown in FIGS. 1 & 2, includes a bolster or bolsters 40 (i.e., attachment hardware). The bracket assembly 38 generally depends from a central portion 42 of the shooting platform 14 (i.e., in a spaced apart condition relative to a perimeter 44 thereof) so as to underlay the marksman 12 supported thereon. The pivot axis 36 of the arm 34 substantially passes through the marksman's center of mass, the weapon staff 18 being thereby swingingly responsive to the marksman's torso motions in pursuit of the target.

The characteristic posture of the marksman 12 has the trigger hand 46 (right) positioned for firing, the support hand 48 engaging a grip 50 of the staff 18, and a butt stock 52 of the weapon 28 resting upon the marksman's shoulder 54. An aiming axis 56 extends through an aiming aid or viewing apparatus 58 (e.g., scope) and includes, as points thereupon, the target and the marksman's eye, the aiming axis defining a variable angle θ with an axis normal to the horizon.

As the mechanics of the marksman change in pursuit of a scoped target (i.e., the changes in body position from FIG. 1 to FIG. 2), the supported weapon, vis-a-vis the aiming support apparatus, literally follows: the arm 34 pivots about the pivot axis 36 in response to the swivel (i.e., torso) motion of the marksman. With this arrangement of structures in the assembly, the marksman may have a secure "base" (e.g., legs/feet while standing, hips/feet while sitting) while the weapon, for all practical purposes, behaves as a supported extension of the marksman's torso, greatly aiding shooting accuracy. As can be readily appreciated, the range of motion is hindered only by, in the case of a tree stand application, the tree trunk 26, a 300°+ range of swivel or pivot motion being generally achievable. It should further be apparent that further fine tune sighting adjustments are possible via left/right, forward/backward deviations of the weapon staff 18 relative to the socket 32 (i.e., by tilting of the free end 60 of the staff 18, via the grip 50, in the sought after direction) of the arm 34.

In addition to aiding aiming per se (i.e., providing a stabilized naturally guided weapon support), the assembly 20 is further advantageous in that a sustainable long term "ready" posture is easily maintained. During transition times, the weapon may be received upon the weapon staff 18 for stand by supporting, as for instance by receipt of a shoulder strap (not shown) upon the fork 60. Furthermore, as the armature swings relative to the platform, ingress/egress relative thereto is greatly facilitated.

Referring now to FIG. 3, the aiming support apparatus 16 generally includes the bracket assembly 38 and the arm 34 pivotably joined or supported thereby. The arm 34 has a base 62 and an extension 64 selectively extendible from a free end 66 of the arm base 62. The arm extension 64 includes the socket 32 which is adapted to receive a shooting post or staff. The bracket assembly 38, affixable to a shooting platform so as to substantially underlay a shooter positioned thereon, suspendingly supports the arm base 62 for pivot motion about the pivot axis 36, the socket 32 being thereby swingingly positionable beyond a perimeter of the shooting platform. Although the apparatus is preferable a tempered aluminum construction having a durable powder coat finish, it should be readily appreciated that other strong, durable light weight materials are equally suitable and considered well within the skill of those in the mechanical or allied arts.

Figure 6:
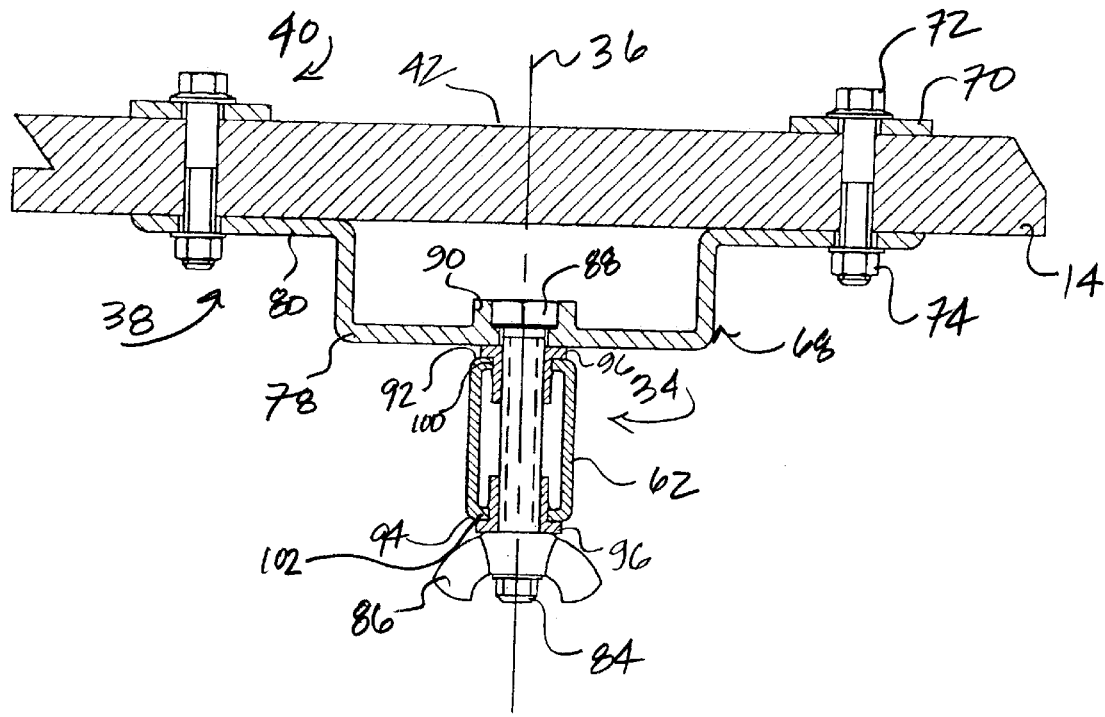
FIG. 6 is a sectional view along line 6—6 of FIG. 3 showing the base affixation assembly of the aiming support apparatus of FIGS. 1–3.
Figure 7:
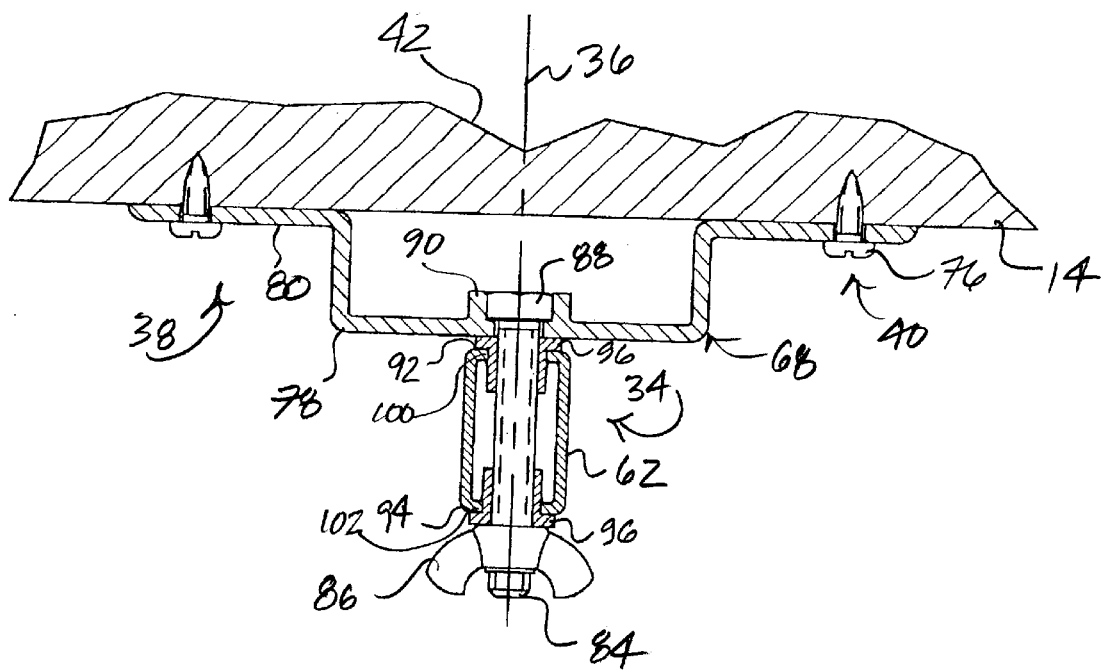
FIG. 7 is a view as FIG. 6 of an alternate base affixation assembly of the aiming support apparatus of the subject invention.
Figure 8:
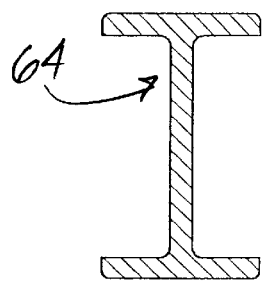
FIG. 8 is a sectional view along line 8—8 of FIG. 3 showing the arm extension in cross section.

Referring now to FIGS. 3, 6 and 7, the bracket assembly 38 generally includes a bracket 68 and platform mounting hardware 40. The hardware of FIG. 6, consistent with the apparatus of FIG. 3, provides a through bolt style for securing a portion of the platform between bracket assembly elements, namely the bracket 68 and a bolster 70 (e.g., bars, plate, etc.) via through bolts 72 and lock nuts 74. The hardware of FIG. 7 provide a direct screw mount attachment style, self tapping screws 76 or the like fastening the bracket 68 to the base 14.

Referring especially to FIG. 6 or 7, the bracket, more particular a profiled base mount 68, has a body 78 and laterally extending legs or flange portions 80 adapted for engagement with a shooting platform or the like. Apertures 82 pass through the flange portions 80 for receipt of fasteners 72/76 therethrough (see FIG. 3, and compare FIGS. 6 and 7). Depending from the body 78 is a rod 84 (e.g., a bolt having a threaded free end), the arm base 62 adapted to be securingly received thereon as by a locking washer and wing nut, or a locking wing nut 86. The rod 84, which is fixed relative to the bracket 68, as by receipt of the bolt head 88 in a bolt head channel 90 as shown, or other known technique, defines the pivot axis 36 for the arm 34 of the apparatus 16. The rod 84 extends through apertured opposing surfaces 92, 94 of the arm base 62, snap bushings 64 being disposed therebetween to insure noise free, low friction pivot motion of the arm 34 relative to the bracket assembly 38.

Referring now to FIGS. 3, and 8–10, the arm 34 of the apparatus 16 includes the base 62 and the extension 64 selectively extendible from the free end 66 of the arm base 62. A set screw 98 is preferably provided to lock (i.e., reversibly secure) the arm extension 64 to the arm base 62, with other such locking structures well known and suitable to alter the length of the arm so as to accommodate the size of a given marksman, in addition to positioning the socket 32 beyond the perimeter 44 of the platform 14.

The arm base 62 is preferably, but not necessarily, configured as a tubular member (e.g., a box beam FIG. 9), the top 100 and bottom 102 sides having opposingly paired apertures 104 therethrough and adjacent an end 106 opposite the free end 66, but ideally not at the terminus thereof. Said another way, the arm base 62 is received upon the rod 84 of the bracket assembly 38 so as to extend in opposite directions therefrom (i.e., the arm base 62 includes major 108 and minor 110 segments separated or delimited by the pivot axis 36 of the arm 34).

Figure 9:
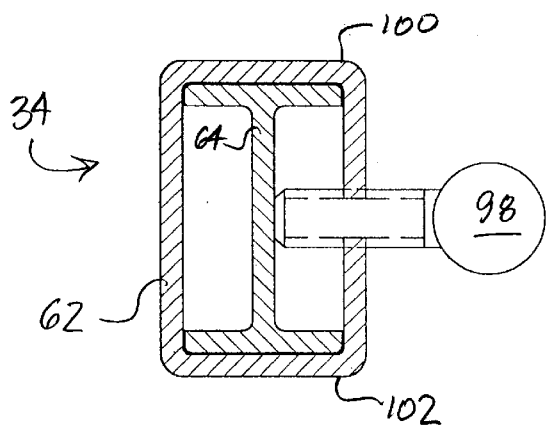
FIG. 9 is a sectional view along line 9—9 of FIG. 3 showing the arm in cross section, and further illustrating a locking element for the arm portions; and, FIG. 10 is a sectional plan view of the free end of the arm of the aiming support apparatus of FIGS. 1–3, more particularly the socket thereof.
Figure 10:
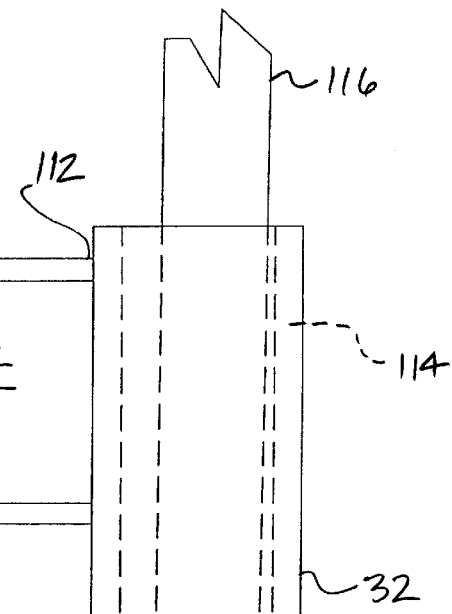

The arm extension 64 is preferably configured as an I beam (FIG. 8) and has a cross sectional extent substantially equivalent to that of the arm base 62 (FIG. 9). The free end 112 of the arm extension 64, more particularly the terminus of the free end, includes the weapon staff receiving socket 32 (FIGS. 3 and 10). The socket 32 preferably has a round (i.e., non-angular) cross section, however it is not so limited. At least some portion (i.e., inner surface) of the socket 32 is ideally lined or fitted with a thermoplastic element 114 (e.g., washer or sleeve) for engagement with the weapon staff 18 (FIG. 10).

Referring now to FIGS. 3–5, the weapon staff 18, which is preferably, but not necessarily, of a variable height to suit a particular marksman's build, generally includes a telescoping strut 116 joined to an upper shaft 118 by a locking collet 120 or the like, and an end 122 (i.e., a base) opposite the fork 60 for receipt within the socket 32 of the arm 34 of the aiming support apparatus 16. Such weapon staffs are well known and of various styles, see for example the sportsman staffs of Stoney Point Products Inc. of New Ulm, MN, namely the Expedition™ or the Explorers, subject of U.S. Pat. No. 6,027,087 entitled RELEASABLY RETAINING TELESCOPING TUBING SEGMENTS (Lindemann et al.).

The fork or v-yoke 60 of the staff 18 readily receives the forestock/barrel 30 of a firearm 28, the lens of a camera, or other viewing device. The staff 18 may be alternately and suitably equipped with a more conventional camera platform 130 (FIG. 4), which includes registration posts 132 and a mounting screw 134, or a commercially available bow mount or bracket 140.

This invention disclosure provides apparatus and assembly configurations which achieve the disclosed functionality and methodology. There are other variations of this invention which will become obvious to those skilled in the art. It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed:

1. An aiming support apparatus dependable from a central portion of a shooting platform, said apparatus comprising:
   a. an arm having a base and an extension selectively extendible from a free end of said arm base, said arm extension including a socket adapted to receive a shooting staff; and,
   b. a bracket assembly affixable to the shooting platform so as to substantially underlay a shooter positioned thereon, said arm base being suspended from said bracket assembly for pivot motion about a pivot axis, said socket being thereby swingingly positionable beyond a perimeter of the shooting platform, a shooter being thereby unencumbered by any portion os said apparatus while entering, exiting or positioned upon the shooting platform.

2. The aiming support apparatus of claim 1 further comprising means for reversibly locking said arm extension to said arm base.

3. The aiming support apparatus of claim 2 wherein said means for reversibly locking said arm extension to said arm base includes a set screw.

4. The aiming support apparatus of claim 1 wherein said pivot axis, substantially passes through a center of mass of the shooter positioned on the shooting platform.

5. The aiming support apparatus of claim 1 wherein said bracket assembly comprises a bracket equipped with a depending rod, said arm base adapted-to securingly receive said rod therethrough.

6. The aiming support apparatus of claim 5 wherein said rod defines said pivot axis.

7. The aiming support apparatus of claim 6 wherein said arm base includes portions opposingly extending from said pivot axis.

8. The aiming support apparatus of claim 6 wherein said arm base includes major and minor segments, said major and minor segments separated by said pivot axis.

9. The aiming support apparatus of claim 6 wherein said bracket includes flange portions, said flange portions adapted for engagement with the shooting platform.

10. An aiming support apparatus dependable from a central portion of a shooting platform, said apparatus comprising:
    a. an arm having a base and an extension selectively extendible from a free end of said arm base, said arm extension including a socket adapted to receive a shooting staff; and,
    b. a bracket assembly affixable to the shooting platform so as to substantially underlay a shooter positioned thereon, said base of said arm being suspended from said bracket assembly for pivot motion about a pivot axis, said socket being thereby swingingly positionable beyond a perimeter of the shooting platform, said bracket assembly comprising a bracket equipped with a depending rod, said arm base adapted to securingly receive said rod therethrough, said rod defining said pivot axis, said bracket including flange portions adapted for engagement with the shooting platform, said bracket assembly further including a bolster positionable to engage the shooting platform and overlay said flange portions for indirect securement therewith.

11. The aiming support apparatus of claim 9 wherein said socket defines a free end for said arm extension.

12. The aiming support apparatus of claim 11 wherein said socket has a circular cross section.

13. The aiming support apparatus of claim 11 wherein said socket is at least partially lined with a thermoplastic element for engagement with the shooting post.

14. The aiming support apparatus of claim 6 wherein said arm base is a tubular member.

15. The aiming support apparatus of claim 14 wherein said tubular member has a rectangular cross section.

16. The aiming support apparatus of claim 15 wherein said arm extension is configured as an I-beam.

17. The aiming support apparatus of claim 14 wherein said tubular member includes an apertured segment for receipt of said rod of said bracket.

18. The aiming support apparatus of claim 17 wherein apertures of said apertured segment include bushings for engagement with said rod.

19. An aiming support assembly comprising:

a. a tree stand;

b. an articulated armature assembly depending from said tree stand, said armature assembly including an extendable arm adapted at a free end thereof to receive a staff, said arm being pivotable about a pivot axis, said pivot axis being substantially aligned with a center of mass of a marksman positioned upon said tree stand; and, c. a staff receivably supported at said free end of said extendable arm, said staff having a free end adapted to receive a cradle.

20. The aiming support assembly of claim 19 wherein said staff includes a telescoping member.

21. The aiming support assembly of claim 19 wherein said cradle is configured to receive a firearm.

22. The aiming support assembly of claim 19 wherein said cradle is configured to receive a bow.

23. The aiming support assembly of claim 19 wherein said cradle is configured to receive a viewing device.

\* \* \* \* \*